(12) United States Patent
McBrien et al.

(10) Patent No.: US 11,573,130 B2
(45) Date of Patent: Feb. 7, 2023

(54) TEMPERATURE DIFFERENCE MEASUREMENT SYSTEM

(71) Applicant: Hamilton Sundstrand Corporation, Charlotte, NC (US)

(72) Inventors: Gary M. McBrien, South Glastonbury, CT (US); Peter A. Dorian, West Hartford, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 502 days.

(21) Appl. No.: 16/692,402

(22) Filed: Nov. 22, 2019

(65) Prior Publication Data

US 2021/0156745 A1   May 27, 2021

(51) Int. Cl.
  *G01K 5/24*   (2006.01)
  *G01K 13/00*   (2021.01)

(52) U.S. Cl.
  CPC .............. *G01K 5/24* (2013.01); *G01K 13/00* (2013.01)

(58) Field of Classification Search
  USPC ................. 374/179, 110, 112, 166
  See application file for complete search history.

(56) References Cited

U.S. PATENT DOCUMENTS

| | | | |
|---|---|---|---|
| 3,902,315 A | 9/1975 | Martin | |
| 3,921,435 A | 11/1975 | Howard | |
| 4,164,172 A | 8/1979 | Anderten et al. | |
| 4,672,566 A * | 6/1987 | Asano | G01D 3/022 73/114.34 |
| 5,067,094 A | 11/1991 | Hayes | |
| 5,971,287 A | 10/1999 | Kettner et al. | |
| 7,534,029 B2 * | 5/2009 | Sorensen, Jr. | F01N 11/00 374/25 |
| 2015/0251766 A1 | 9/2015 | Atkey | |
| 2016/0349117 A1 | 12/2016 | Castro et al. | |
| 2019/0136492 A1 | 5/2019 | Trescott et al. | |
| 2019/0309683 A1 | 10/2019 | Mackin et al. | |
| 2021/0156745 A1 | 5/2021 | McBrien et al. | |

FOREIGN PATENT DOCUMENTS

EP   3165462 A1   5/2017

OTHER PUBLICATIONS

European Search Report for EP Application No. 20206631.2 dated Apr. 16, 2021.
European Search Report for EP Application No. 20208482.8 dated Apr. 15, 2021.

* cited by examiner

*Primary Examiner* — Mirellys Jagan
(74) *Attorney, Agent, or Firm* — Carlson, Gaskey & Olds, P.C.

(57) ABSTRACT

A system has a first temperature sensor located at a first location. A second temperature sensor is located at a second location. A control is configured to determine a difference between voltages indicated of a temperature sensed by each of the first and second sensors. A method is also disclosed.

5 Claims, 3 Drawing Sheets

TEMPERATURE DIFFERENCE MEASUREMENT SYSTEM

BACKGROUND

This application relates to a temperature difference measurement system. Temperature difference information is utilized in any number of applications for modern systems. As one example, a temperature difference might sensed to determine the health of various components within a system.

However, current systems for measuring a temperature difference typically rely upon a sensor voltage being sent to a so called "cold junction." A temperature sensed at the cold junction is used to reach an absolute value for the temperature sensed by the sensor.

Such cold junctions require a transition from a sensor wire to a copper wire, and a way to measure the temperature at the cold junction. Once the temperature is measured then an adjustment must be added or subtracted to arrive at the apparent temperature at the two locations.

This may not always be as accurate as is desired. Further, the method is complex and carries the possibility of error.

SUMMARY

A system has a first temperature sensor located at a first location. A second temperature sensor is located at a second location. A control is configured to determine a difference between voltages indicated of a temperature sensed by each of the first and second sensors.

A method is also disclosed.

These and other features may be best understood from the following drawings and specification.

DETAILED DESCRIPTION

Broadly, this disclosure covers a temperature difference measurement system. One possible application is disclosed below; to monitor valve health within a ducting system. However, it should be understood that the teachings of this disclosure would extend to any number of other temperature difference applications.

Figure 1:
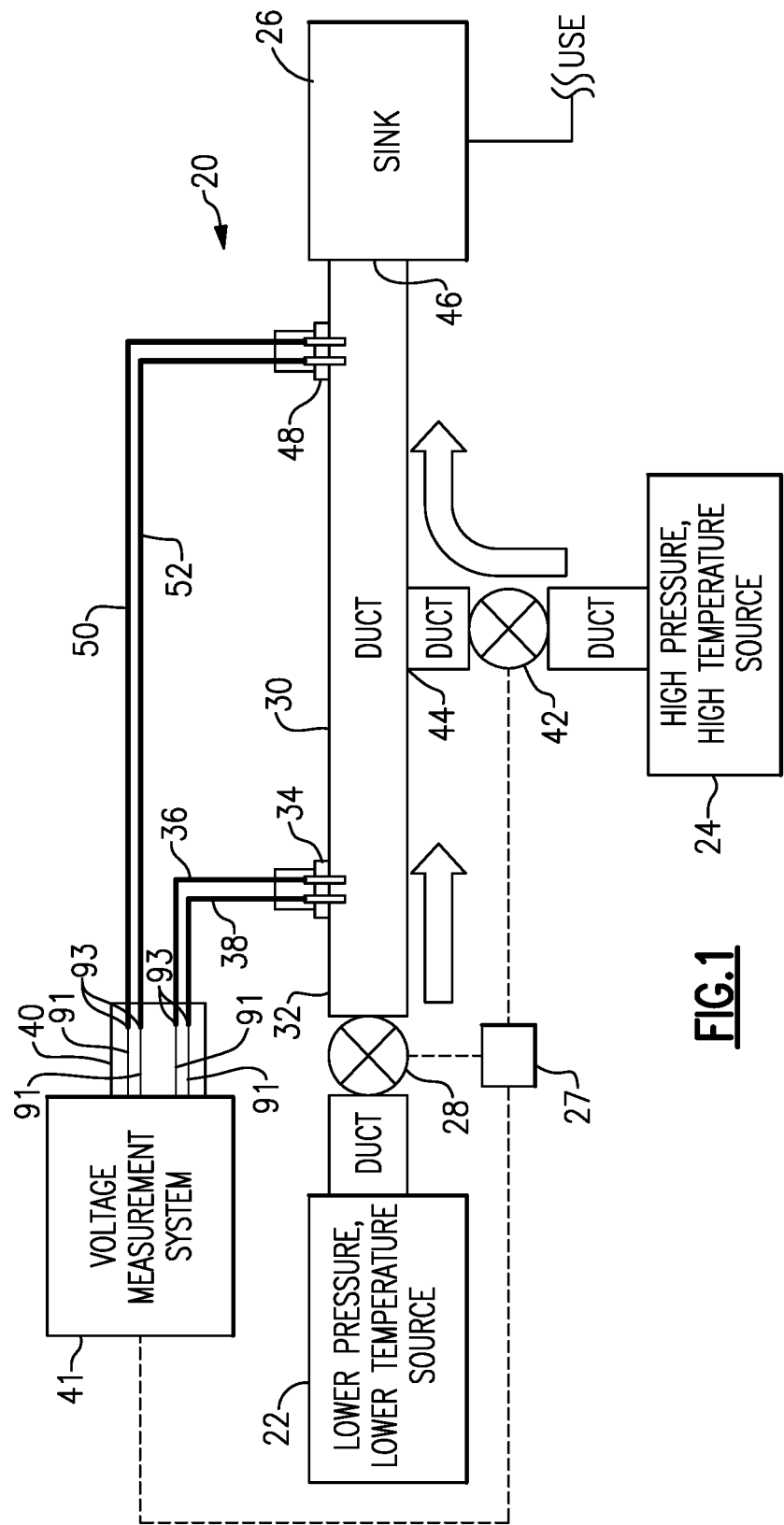
FIG. 1 shows a first system for measuring temperature difference.

FIG. 1 shows a first embodiment ducting system 20. A first air source 22 is at a relatively low pressure and temperature. A second air source 24 is at a relatively higher pressure and higher temperature than the pressure and temperature of first air source 22. A sink 26 receives a mixture of air from the sources 22 and 24.

One application of the sink 26 is for air frame purposes on an aircraft. As known, aircraft have any number of systems which require air at a desired pressure and temperature. These are identified as USE in the Figures.

Control 27 communicates with a first valve 28 controlling the flow from the first air source 22 into a duct 30 at an upstream location 32. The control 27 also controls a second valve 42 for supplying air from the second air source 24 into the duct 30 at a downstream location 44. Downstream location 44 is downstream of the upstream location 32 where the lower pressure/temperature source 22 enters the duct 30. The air is then passed to the sink 26 at an end location 46 of the duct 30.

In other embodiments the upstream location can be connected to the higher pressure/temperature source 24, with the downstream location connected to the lower pressure/temperature source 22.

Control 27 is programmed as known to control the valves 28 and 42 to mix the air at the two temperatures and pressures to arrive at a desired pressure and temperature for the air supplied to the sink 26.

Control 27 is also shown communicating with voltage measurement system 41. A junction 40 receives signals from a first temperature sensor 34, which is at a location intermediate the upstream location 32 and the downstream location 44. Thus, temperature sensor 34 is sensing the temperature of the air supplied only from the first source 22.

A second temperature sensor 48 is located downstream of the location 44, and intermediate the downstream location 44 and the end location 46. As such, sensor 48 will measure the temperature of what might be a mixed air flow.

Control 27 may close one of the two valves 28, 42 or leave them both partially open. Control 27 will be able to calculate a predicted temperature difference between the temperatures sensed at 34 and 48 based upon the status of the valves 28 and 42. This disclosure utilizes that predicted difference to provide feedback on the health of the valves 28 and 42.

In one embodiment, the sensors 34 and 48 are so-called thermocouple sensor which will translate a sensed temperature into a voltage.

Sensor 34 has a pair of wires, a first wire 36 that may be alumel and a second wire 38 that may be chromel. These two wires are communicated to junction 40.

The sensor 48 also communicates through a pair of wires, a wire 50, which may be alumel, and a wire 52, which may be chromel.

All four wires transition to copper wires 91 at points 93 within junction 40.

One of the two voltage signals supplied to the system 41 can then be subtracted from the other, and a difference identified. The control 27 can utilize that difference to predict whether the valves 28 and 42 are operating as desired. If the difference is off from a predicted difference by more than a predetermined amount, then a determination may be made that one of the valves 28/42 may not be operating properly. As an example, should the valve 42 be properly closed and there is a significant difference between the temperatures sensed by sensors 34 and 48, this is indicative that the valve 42 may be improperly open. Conversely, if the valve 28 is intended to be closed, but the difference sensed by sensors 34 and 48 is not as much as expected, this might be an indication that the valve 28 is not operating properly.

By comparing the temperature sensed by sensors 34 and 48 to each other, rather than a reference number as was done in the prior art, more accuracy is achieved. As mentioned, known temperature sensors typically include a so called "cold junction" at which a sensor wire connects to a copper wire extending into a control or measurement system. The cold junction would include a temperature sensor for measuring the temperature at the cold junction. Algorithms are then utilized to determine the temperature sensed by the main sensor but utilizing this cold junction temperature.

Figure 2:
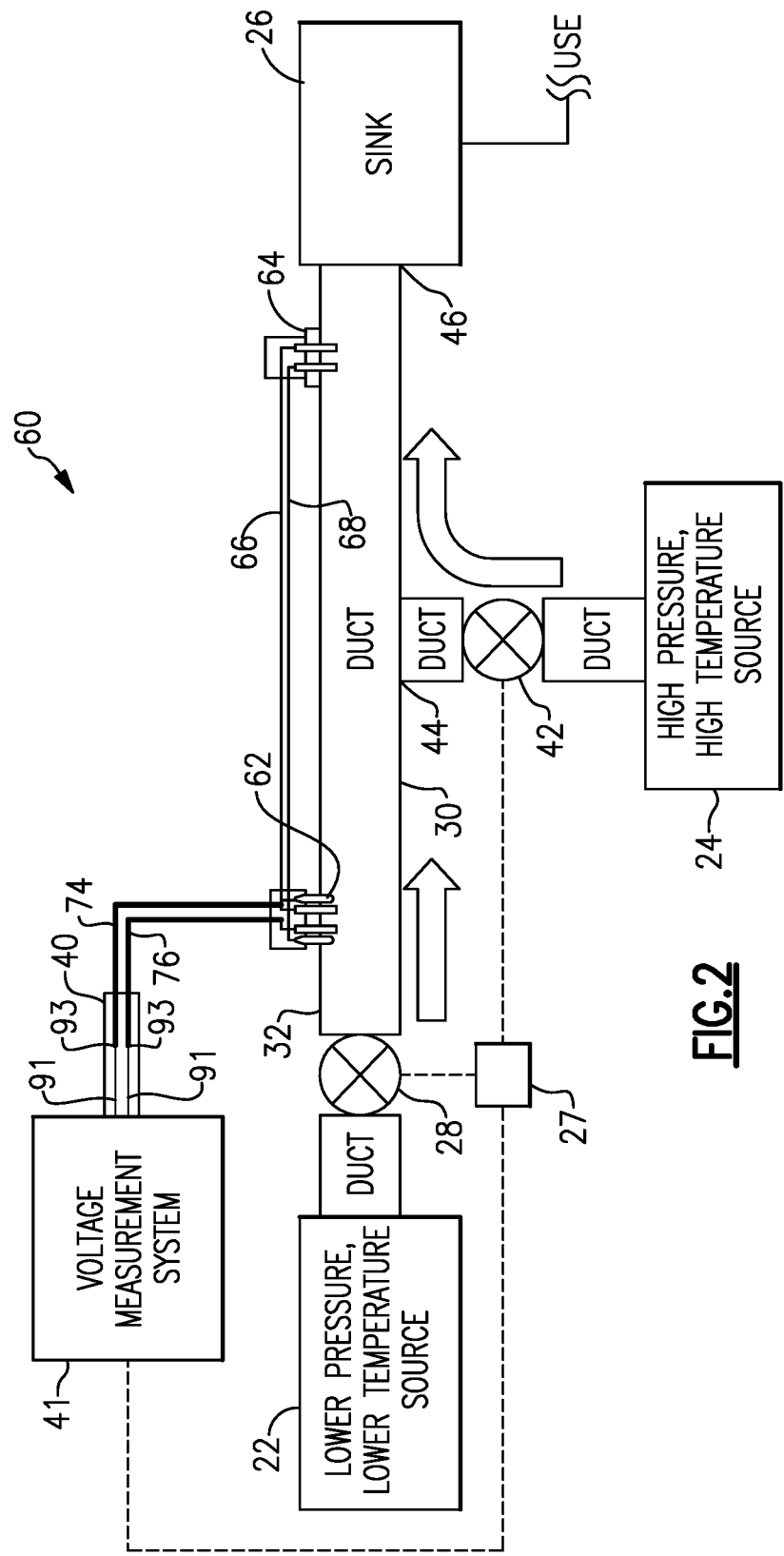
FIG. 2 shows a second embodiment system for measuring temperature difference.

FIG. 2 shows a ducting system 60. Elements which are similar to the system 20 are identified by identical numbers. What is distinct from the FIG. 1 embodiment here is the sensor 64 downstream of downstream location 44 now has an alumel wire 66 and a chromel wire 68, which each communicate to the sensor 62. In fact, those wires connect to wires 74 and 76, which communicate from the sensor 62 to the measurement system 41. Based on the physics of thermocouple materials and, in particular, a phenomenon known as the Seebeck effect, the voltage of wires 74 and 76 will be indicative of a temperance difference between sensors 62 and 64. If the temperature from sensor 64 is different than the temperature from sensor 62, then a voltage will be sensed and that voltage will be indicative of the amount of difference in the temperature sensed by sensors 62 and 64. By sensing a difference, and supplying only that difference to measurement system 41, greater accuracy is achieved. Of course, sensor 62 can send its pair of wires and signal to sensor 64.

Figure 3:
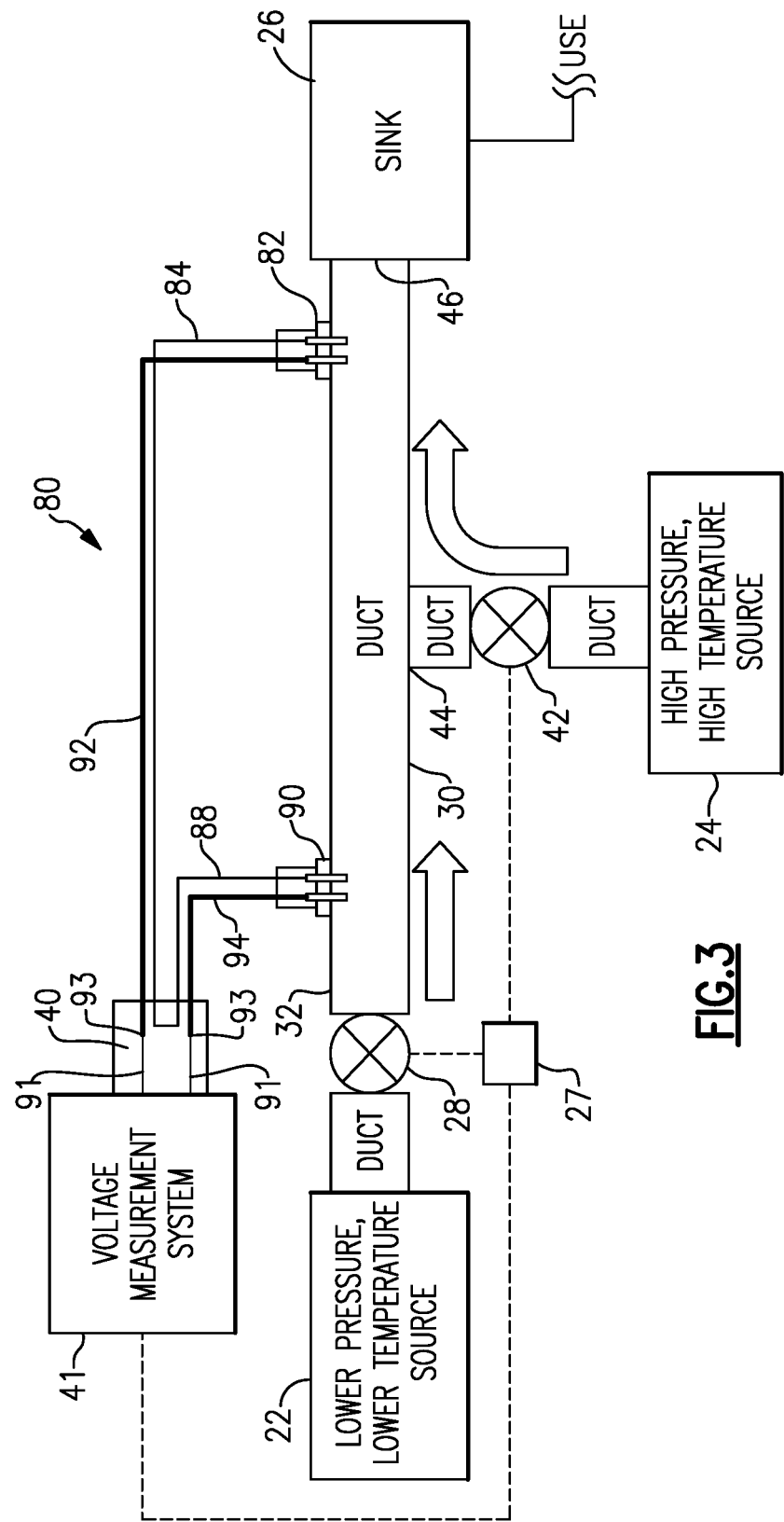
FIG. 3 shows a third embodiment system for measuring temperature difference.

FIG. 3 shows yet another embodiment 80. The downstream sensor 82 has an alumel wire 84, which communicates as a connection 88 to the upstream sensor 90. Sensor 82 has its own chromel wire 92 extending to a connection 93 with a copper wire 91 at junction 40. As is clear from the Figure, the common wire 84/88 connects each of the sensors 9290 and 82, and also extends to the junction 40. Sensor 90 has its own chromel wire 94 communicating to a copper wire-G 91 at a junction within a cold junction 40.

Essentially, there is a loop voltage on the entire circuit from one wire 84/88 which will be representative of the net voltage difference corresponding to the different in temperature between sensors 82 and 90. This can be shown utilizing the voltage law for Thevenien voltage circuit loop.

A system could be said to include a first temperature sensor located at a first location. A second temperature sensor is located at a second position. A control is configured to determine a difference between voltages indicative of the temperature sensed by each of the first and second sensors. The control may be programmed to determine the health of a component based upon a difference between the temperatures sensed by the first and second sensors.

A method of identifying a temperature difference includes the steps of sensing a first temperature at a first location and sensing a second temperature at a second location. The method converting the first and second sensed temperatures into voltages, and identifying a temperature difference by determining a difference between the voltages indicative of the first and second temperatures. The first temperature is sensed by a first sensor and the second temperature is sensed by a second sensor and voltage signals from each of the first and second temperature sensors are communicated to a measurement system through a pair of wires. In one embodiment, each of the pair of wires for each of the first and second temperatures communicate to the measurement system. In another embodiment, both of the pair of wires from the second temperature sensor communicate to the first temperature sensor such that a temperature difference between the temperature sensed at the first and second temperature sensor will be proportional to a voltage supplied by the pair of wires from the first temperature sensor to a measurement system. In another embodiment, one of the pair of wires from each of the first and second temperature sensors communicates to a junction associated with the measurement system, and a second of the pair of wires of each of the first and second temperature sensors is a common wire that connects the second temperature sensor to the first temperature sensor. The temperature difference may be utilized to monitor the health of a component in an associated system.

The control may be any type of electronic controller programmed to achieve the disclosed features.

The several embodiments disclosed here will provide a more accurate identification of a temperature difference that was the case in the prior art.

In general, the three embodiments allow a control to identify a temperature difference based upon the voltages sensed at the temperature sensors and without a requirement for any cold junction temperature sensor. The FIG. 1 embodiment provides this by sending the voltages directly to the measurement system, and such that the temperature itself need not be determined at all. Instead, only the difference is determined. On the other hand, the embodiments of FIGS. 2 and 3 essentially send only a signal indicative of the difference to the measurement system 41

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A method of identifying a temperature difference comprising the steps of:
    sensing a first temperature at a first location and sensing a second temperature at a second location, converting said first and second sensed temperatures into first and second voltages, and identifying a temperature difference by determining a difference between said first and second voltages;
    wherein said first temperature is sensed by a first temperature sensor and said second temperature is sensed by a second temperature sensor, and said voltages from each of said first and second temperature sensors are communicated to a measurement system through a pair of wires;
    wherein each of said first and second temperature sensors is configured to communicate to the measurement system through the pair of wires, said measurement system being configured to communicate to a control that identifies the temperature difference by determining the difference between said first and second voltages; and
    wherein both of said pair of wires from said second temperature sensor communicate to said first temperature sensor such that a temperature difference between the temperature sensed at said first and second temperature sensors will be proportional to a voltage supplied by said pair of wires from said first temperature sensor to said measurement system.

2. The method as set forth in claim 1, wherein said temperature difference is utilized to monitor the health of a component in an associated system.

3. A system comprising:
    a first temperature sensor located at a first location, and a second temperature sensor located at a second location; and
    a control configured to determine a difference between voltages indicative of temperatures sensed by each of said first and second temperature sensors;
    wherein each of said first and second temperature sensors is configured to communicate to a measurement system through a pair of wires, said measurement system being configured to communicate to said control;
    said pair of wires from said first temperature sensor extend to said measurement system, and at least one of said pair of wires of said second temperature sensor communicates to said first temperature sensor; and wherein both of said pair of wires from said second temperature sensor communicate to said first temperature sensor, such that a temperature difference between the temperatures sensed at said first and second temperature sensors will be proportional to a voltage supplied by said pair of wires from said first temperature sensor to said measurement system.

4. The system as set forth in claim 3, wherein one of said pair wires communicating said second temperature sensor to said first temperature sensor is chromel and a second of said wires communicating said second temperature sensor to said first temperature sensor is alumel.

5. The system as set forth in claim 4, wherein each of said wires communicating said first temperature sensor to said measurement system are copper.

* * * * *